3,458,591
REMOVAL OF ALKYNE IMPURITY FROM
BUTADIENE-1,2
Robert L. Bebb and Edward L. Kay, Akron, Ohio, assignors to The Firestone Tire & Rubber Company, Akron, Ohio, a corporation of Ohio
No Drawing. Filed Dec. 4, 1967, Ser. No. 687,491
Int. Cl. C07c 7/00
U.S. Cl. 260—681.5
7 Claims

ABSTRACT OF THE DISCLOSURE

This disclosure relates to a method for removing alpha-acetylenes from a butadiene-1,2 concentrate. The alpha-acetylenes are undesirable impurities for a number of purposes for which the butadiene-1,2 is to be used, particularly in alkyllithium catalyzed polymerizations. Analysis after treatment shows that the alpha-acetylenes can be completely removed from butadiene-1,2 concentrates by treatment with a solution of sulfuric acid containing mercuric ions.

BACKGROUND OF THE INVENTION

Field of the invention

The present invention relates to a process for the removal of alpha-acetylenes from a butadiene-1,2 concentrate. More specifically, it relates to the process for such removal by treatment with a sulfuric acid solution containing mercuric ions.

Description of the related prior art

Butadiene-1,2 is particularly useful in the polymerization of butadiene-1,3 catalyzed by alkyllithium catalysts. Its presence serves to minimize gel-formation.

Butadiene-1,2 can be recovered from crude butadiene-1,3 by distillation. However, unless there is sufficient use of the butadiene-1,2 to warrant large scale distillation, this separation is also expensive.

Crude butadiene-1,3 generally contains about 98–99% butadiene-1,3, less than 1% of butadiene-1,2 and a number of other materials including 1-butyne and 1-butene-3-yne, both of which alpha-acetylenes react with the lithium alkyl when such a crude concentrate is used in a polymerization catalyzed by an alkyllithium.

Tooke et al. Patent 2,543,478 discloses the use of an aqueous solution of HgO in dilute sulfuric acid and a lower molecular weight alcohol for the removal of acetylenes from a $C_3$–$C_4$ hydrocarbon fraction containing butene-2 and also butadiene-1,3. This process is intended primarily to produce a butene-2 of extreme purity. In view of the allenic structure of butadiene-1,2 and the similarity in properties between an alkyl alpha-acetylene and the corresponding allene, it would be expected that a mercuric oxide-sulfuric acid solution which would remove an alpha-acetylene would likewise react with and remove the corresponding allene compound, namely butadiene-1,2.

Similarly British Patent 570,650 shows the removal of acetylenic compounds from butadiene by treatment with an aqueous solution of mercuric oxide, sulfuric acid and a ferric salt as an oxidizing agent. Neither of these references refer to the presence of butadiene-1,2 nor give any indication that if such an allene compound was present that it would not be removed simultaneously by reaction with the mercuric oxide.

SUMMARY OF THE INVENTION

In accordance with the present invention, it has been found surprisingly that alpha-acetylenes, such as butyne-1 and 1-butene-3-yne, can be substantially completely removed from a butadiene-1,2 concentrate containing at least 5%, preferably at least 10% by weight of butadiene-1,2 by treatment with a solution of sulfuric acid containing mercuric ions without substantial loss of the butadiene-1,2. This can be accomplished by careful control of various interdependent conditions including temperature, time, efficiency of agitation and concentration of mercuric ions. The appropriate range for any one of these conditions will vary according to the particular other conditions. For example, the appropriate period for substantial removal of alpha-acetylenes without substantial removal of butadiene-1,2 will decrease as the temperature and/or efficiency of agitation are increased. Consequently it is impossible to set limits on the ranges of time, temperature and agitation since the limits on each of these will vary according to variations in the others. If these various conditions are not satisfactorily controlled, substantial amounts or even all of the butadiene-1,2 may be removed.

The concentration of sulfuric acid is advantageously in the range of 10–50% by weight and the concentration of mercuric ions in the resultant acid solution, calculated on the basis of mercuric oxide, is in the range of 0.1–10%, preferably in the range of 0.2–2% by weight. Advantageously the proportion of treating solution to hydrocarbon is in the range of 0.01–100 volumes of solution per volume of hydrocarbon.

In a preferred modification, the acid solution is recycled with a portion of the acid being withdrawn and discarded and with sufficient makeup acid and mercuric oxide being added to the recycled material to maintain desired concentrations.

Because of the low proportions of alpha-acetylenes present in the hydrocarbon being treated and the desirability of substantially complete removal of this material, it is essential that there be very efficient agitation to provide intimate contact between the acid solution and the hydrocarbon. If the agitation is not adequate to provide intimate contact, it is necessary that the period of contact be prolonged to insure that the alpha-acetylenes present have sufficient opportunity to react. With very efficient agitation a period of at least one hour or more, preferably at least two hours, is sufficient. With less efficient agitation, the period should be at least 10 hours, advantageously 15 hours or more.

While applicants do not wish to be committed to any particular reaction, it is believed that the alpha-acetylenes react in general as follows:

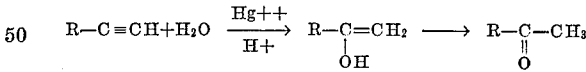

Generally temperatures in the range of 30–120° F., preferably 60–100° F. are appropriate. The pressure can be any convenient pressure which will maintain the hydrocarbon in liquid condition and provide intimate contact between the acid and hydrocarbon.

The treated hydrocarbon is separated from the acid layer after phase separation and the hydrocarbon layer is washed with water or dilute alkali to remove occluded acid, advantageously a 1–20 percent, preferably 5–10 percent solution of NaOH, KOH, $Ca(OH)_2$, etc.

The butadiene-1,2 concentrate can be obtained by careful fractionation of a commercial butadiene-1,3 or other hydrocarbon mixture containing at least a small percentage of butadiene-1,2. For example, careful fractionation of a commercial butadiene-1,3 having 98–99% butadiene-1,3 and less than 1% butadiene-1,2 can be effected to give a bottom fraction of more than 10% and even 17–20% or more of butadiene-1,2.

The diolefin starting material can be a hydrocarbon stream containing any appreciable amount of the desired diolefin for example as produced by a petroleum refining operation, by any of the well-known dehydrogenation processes for producing butadiene, or from an alcohol by any of the known processes.

This concentrate can be mixed either before or after removal of the alpha-acetylenes with a liquid hydrocarbon diluent, preferably inert to the stereospecific polymerization catalysts, e.g., one or more of the following: butane, isobutane, any butene, pentane, any pentene, any hexane, any hexene, any heptane, any heptene, any octane, any octene, benzene, toluene, any xylene, cyclopentane, methylcyclopentane, cyclohexane, methylcyclohexane, ethylcyclopentane, ethylcyclohexane, cyclopentene, cyclohexene, any methylcyclopentene, any ethylcyclohexene, any methylcyclohexene, any ethylcyclopentene and similar normally liquid hydrocarbons up to and including those containing ten carbon atoms.

The invention can be carried out as a batch process or a continuous process. The hydrocarbon diluent, if employed, can be chosen for convenience in a subsequent polymerization step; for example, the diluent can be petroleum ether or a mixture of benzene and pentane. The concentration of the diolefins in any such stream of diluent is not critical, but normally is in the range of 5 to 50 weight percent.

The aqueous treating solution preferably contains mercuric ion in the range of 0.2 to 0.6 percent by weight calculated as mercuric oxide. However this range is not critical, and a concentration of 0.005 to 10 percent of mercuric ions (calculated as mercuric oxide) is operable. A suitable concentration of sulfuric acid in the treating solution is 20 weight percent, although 10 to 50 percent sulfuric acid is operable. The treating solution is conveniently prepared by diluting commercial sulfuric acid (93 to 98%) with water to produce the desired concentration, preferably approximately 20 weight percent acid, and then sufficient mercuric oxide is added to provide a concentration of 0.2 to 0.6 weight percent. After the catalyst solution becomes depleted through use in the invention, it can readily be rejuvenated by the addition of a concentrated solution of mercuric sulfate in sulfuric acid.

The invention comprises a heterogeneous reaction between the aqueous treating solution and an immiscible liquid phase containing the diolefin and impurities. The aqueous phase and the diolefin phase are mixed by vigorous agitation of the two liquid phases. Such mixing is accomplished by, for example, turbine agitation, e.g., by means of a powered rotatable shaft carrying one or more propellers, or nozzle-type mixing, such as by pumping a mixture of the two phases through a nozzle or orifice or a multiplicity of nozzles or orifices or through a reactor fitted with baffles. The temperature of the two phases is conveniently from 30° to 120° F., and usually from 60° to 100° F. The time of treatment varies from about 1–2 hours up to 10–15 hours, depending on a number of factors, including the concentration of acetylenes in the raw diolefin, the ultimate desired concentration of acetylenes and other impurities in the treated diolefin, the reaction temperature, the concentration of mercuric ions in the treating solution, the volume ratio of treating solution to diolefin phase, the rate of agitation, and other factors.

The treated diolefin phase is allowed to separate from the denser aqueous treating solution and then is washed with water or a second aqueous treating solution to remove occluded acid and also to remove inhibitor, if present. For this second treating solution it is preferred to use an alkali solution, conveniently a 15 weight percent sodium hydroxide solution (5 to 25 percent NaOH is operable), as this solution satisfactorily removes the usual inhibitor of diolefin polymerization, a tertiary-butylcatechol, when properly mixed with the diolefin phase. This aqueous washing also removes from the treated diolefin phase the by products formed by hydration of the alpha-acetylenes.

Then the diolefin is separated from the alpha-acetylene byproduct compounds by a suitable method. One method involves merely drying the diolefin phase and then distilling the desired diolefin from the carbonyl compounds. Another method makes use of a solution of sodium bisulfite (or of a coating of $NaHSO_3$ on a solid carrier) to absorb the byproduct compounds, upon appropriately bringing the diolefin phase into contact with such $NaHSO_3$ preparation. Another method involves passing the diolefin phase through a suitable adsorbent, such as alumina, silica or molecular sieves by which the byproducts are selectively adsorbed. An additional method effects separation of the byproducts by water or aqueous extraction, that is, by mixing the impure diolefin phase with water or aqueous solution phase, as by countercurrent flow through a wash tower. The preferred commercial method for removing these byproducts is by adsorption, as by means of silica, from the liquid diolefin phase and/or by distillation.

DESCRIPTION OF SPECIFIC EMBODIMENTS

The invention is best described and illustrated by the following examples. These examples are presented merely for the purpose of illustration and are not intended in any way to restrict the scope of the invention or the manner in which it can be practiced. Except where otherwise indicated, parts and percentages are given by weight.

Example

Equal parts of a butadiene-1,2 concentrate and a sulfuric acid solution containing 20% $H_2SO_4$ and 0.4% of HgO are charged to each of two glass bottles and the bottles capped. These bottles are independently placed in a tumbler device adapted to rotate the bottle and maintain it at a constant temperature. Each bottle is maintained a 41° F. for 16 hours, after which analysis shows that the alpha-acetylenes are completely removed. The analyses of the hydrocarbon before and after treatment are shown in the table below.

|  | Percent | | |
|---|---|---|---|
|  | Before treatment | After treatment | |
|  |  | Sample 1 | Sample 2 |
| Butene-1 | 0.01 | 0.09 | 0.11 |
| t-Butene-2 | 8.08 | 8.29 | 8.17 |
| c-Butene-2 | 16.75 | 18.91 | 18.86 |
| 1,3-butadiene | 42.34 | 49.30 | 50.60 |
| 1,2-butadiene | 21.70 | 17.65 | 16.70 |
| 1-butyne | 3.76 | None | None |
| 2-methylbutene-1 | 1.04 | 1.19 | 1.21 |
| 1-butene-3-yne | 0.23 | None | None |
| 2-butyne | 5.99 | 4.56 | 4.22 |

Lithium catalysts suitable for polymerizing the butadiene-1,3 containing butadiene-1,2 and reduced in content of alpha-acetylenes or substantially free thereof, including polymerization of this mixture as such or with styrene or other arylolefin monomer are disclosed in British Patents 813,198 and 817,693. The relevant disclosures of these patents are incorporated herein by reference. Regular or uniform copolymers of butadiene with styrene or other arylolefin monomer can be produced by means of a lithium catalyst in accordance with the disclosure in Belgian Patent 634,869, and said disclosure is incorporated herein by reference. The present invention extends to the polymerization by any of the techniques disclosed in these three reference patents of one or more purified conjugated diolefin monomer preparations as disclosed herein, whether as a purified diolefin monomer mixture as such, or a purified blend of an inert hydrocarbon solvent and the diolefin monomers. The resulting synthetic rubber products are more uniform in properties, and in some respects possess superior properties, as compared with the synthetic rubbers described in the three reference patents referred to above.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The process of removing alpha-acetylenes from a hydrocarbon butadiene-1,2 concentrate containing at least 5 percent by weight of butadiene-1,2 and also containing alpha-acetylenes as impurities comprising the steps of
    (a) treating said concentrate at a temperature of 30°–120° F. with an aqueous solution of sulfuric acid containing 10–50% by weight sulfuric acid and 0.1–10% by weight of mercuric ions, calculated on the basis of mercuric oxide, with efficient agitation and for a period of 2–15 hours to substantially reduce the alpha-acetylene content thereof without substantial reduction of the butadiene-1,2 content, and
    (b) thereafter separating the acid phase from the treated concentrate.

2. The process of claim 1 in which said treated separated concentrate is given an aqueous wash to remove acid residues and alpha-acetylene byproducts therefrom.

3. The process of claim 2 in which said aqueous wash is dilute alkali solution.

4. The process of claim 3 in which said solution is a dilute aqueous NaOH solution.

5. The process of claim 1 in which said treatment is conducted at a temperature of 60–100° F.

6. The process of claim 1 in which said treated separated concentrate is distilled to separate butadiene-1,2 concentrate from the alpha-acetylene byproducts resulting from said treatment.

7. The process of claim 1 in which said treated separated concentrate is percolated over an adsorbent selected from the class consisting of alumina, silica and an adsorbent molecular sieve.

References Cited

UNITED STATES PATENTS

| | | |
|---|---|---|
| 1,151,928 | 8/1915 | Duden et al. |
| 1,436,550 | 11/1922 | Trevoux. |
| 2,543,478 | 2/1951 | Tooke et al. _____ 203—31 |

FOREIGN PATENTS 570,650  7/1945  Great Britain.

DELBERT E. GANTZ, Primary Examiner

G. E. SCHMITKONS, Assistant Examiner

U.S. Cl. X.R.

203—31; 260—605